(12) United States Patent
Mohr et al.

(10) Patent No.: US 10,440,157 B2
(45) Date of Patent: Oct. 8, 2019

(54) DISTRIBUTED MEASUREMENT ARRANGEMENT FOR AN EMBEDDED AUTOMOTIVE ACQUISITION DEVICE WITH TCP ACCELERATION

(71) Applicant: Robert Bosch GmbH, Stuttgart (DE)

(72) Inventors: Paul Mohr, Weinstadt-Beutelsbach (DE); Stephan Straub, Pluederhausen (DE); Christopher Pohl, Duesseldorf (DE); Kai Roettger, Stuttgart (DE); Herbert Leuwer, Backnang (DE); Thomas Bayer, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 14/050,954

(22) Filed: Oct. 10, 2013

(65) Prior Publication Data

US 2014/0108603 A1    Apr. 17, 2014

(30) Foreign Application Priority Data

Oct. 16, 2012   (EP) ..................................... 12188660

(51) Int. Cl.
*G06F 15/16*        (2006.01)
*H04L 29/06*        (2006.01)
(Continued)

(52) U.S. Cl.
CPC ............ *H04L 69/16* (2013.01); *H04L 47/193* (2013.01); *H04L 67/12* (2013.01); *H04L 69/161* (2013.01)

(58) Field of Classification Search
CPC ...... B60W 10/02; B60W 10/08; B60W 20/40; B60W 20/00; G07C 5/008; G07C 5/02; G07C 5/0808
(Continued)

(56) References Cited

U.S. PATENT DOCUMENTS 7,313,600 B1 * 12/2007 Tannous .................. H04L 67/08
                                                         370/469
7,403,542 B1 *  7/2008 Thompson .............. H04L 69/16
                                                         370/389
(Continued)

FOREIGN PATENT DOCUMENTS

CN       101783941 A       7/2010
CN       102098734 A       6/2011
(Continued)

OTHER PUBLICATIONS

"TCP offload engine", from Wikipedia (Redirected from TCP Offload Engine), printed on Oct. 16, 2017, pp. 1-5.

*Primary Examiner* — Dhairya A Patel
(74) *Attorney, Agent, or Firm* — Norton Rose Fulbright US LLP; Gerard Messina

(57) ABSTRACT

The invention refers to a method and a communication system for transmitting in either direction data between any two devices in a client layer and/or a transport layer of a communication system. The data transmission is performed according to the transport control protocol, referred to hereinafter as TCP. In order to achieve a high data transmission rate it is suggested that central storage means (12) for buffering the data to be transmitted and a TCP protocol operation block (10) are provided within the communication system, wherein the TCP protocol operation block (10) handles references on the transported data stored in the storage means (12) instead of the data itself. The invention also refers to an embedded acquisition device (1) located between the two devices of the communication system, between which the data is to be transmitted. The acquisition device (1) comprises means adapted for performing the method according to the present invention.

22 Claims, 6 Drawing Sheets

(51) Int. Cl.
*H04L 29/08* (2006.01)
*H04L 12/801* (2013.01)

(58) Field of Classification Search
USPC .............. 709/248; 710/52; 713/151; 726/30
See application file for complete search history.

(56) References Cited

U.S. PATENT DOCUMENTS

| | | | | |
|---|---|---|---|---|
| 7,818,563 B1* | 10/2010 | Dwork | .................... | H04L 63/06 713/151 |
| 2002/0003783 A1* | 1/2002 | Niemela | ............... | H04W 92/12 370/329 |
| 2003/0223433 A1* | 12/2003 | Lee | ........................ | H04L 69/16 370/395.52 |
| 2004/0198466 A1 | 10/2004 | Walby et al. | | |
| 2005/0060443 A1* | 3/2005 | Rosner | ................. | G06F 13/128 710/33 |
| 2006/0047947 A1* | 3/2006 | Langworthy | ........... | H04L 69/16 713/151 |
| 2006/0072455 A1* | 4/2006 | Cai | .................... | H04L 63/1416 370/230 |
| 2007/0127525 A1 | 6/2007 | Sarangam et al. | | |
| 2007/0140281 A1* | 6/2007 | Chan | ....................... | H04L 49/90 370/412 |
| 2008/0151881 A1* | 6/2008 | Liu | ....................... | H04L 1/0002 370/389 |
| 2008/0170501 A1* | 7/2008 | Patel | .................... | H04L 1/1874 370/235 |
| 2008/0256271 A1* | 10/2008 | Breed | .................... | G06F 12/06 710/52 |
| 2008/0256323 A1* | 10/2008 | Mopur | .................... | H04L 45/00 711/173 |
| 2008/0263171 A1* | 10/2008 | Craft | ....................... | G06F 13/28 709/212 |
| 2010/0158032 A1* | 6/2010 | Carlsson | ................ | H04L 47/10 370/412 |
| 2010/0183024 A1* | 7/2010 | Gupta | ................... | H04L 1/0072 370/463 |
| 2011/0131666 A1* | 6/2011 | Tanaka | .................. | G07C 5/008 726/30 |
| 2012/0230208 A1* | 9/2012 | Pyatkovskiy | ........... | H04L 43/10 370/250 |
| 2013/0166778 A1* | 6/2013 | Ishigooka | ........... | H04L 12/4035 709/248 |
| 2014/0237156 A1* | 8/2014 | Regula | .................... | G06F 21/85 710/314 |

FOREIGN PATENT DOCUMENTS

EP          2287691 A1 *  2/2011
WO     WO 2008/073493        6/2008

* cited by examiner

DISTRIBUTED MEASUREMENT ARRANGEMENT FOR AN EMBEDDED AUTOMOTIVE ACQUISITION DEVICE WITH TCP ACCELERATION

BACKGROUND OF THE INVENTION

1. Field of the Invention

The present invention relates to a distributed measurement system for an embedded automotive acquisition device.

2. Description of the Related Art

In such systems the transport control protocol (TCP) is widely used for the reliable transport of measurement, calibration and diagnostic (MCD) data between embedded acquisition devices connected to automotive electronic control units (ECUs) and automotive development software tools running on personal computers (e.g. INCA from ETAS GmbH).

The embedded acquisition devices are often co-located to the ECU (device under test, DUT) and must operate under the same harsh environmental conditions as the ECU itself. Supplied from the vehicle's battery, the power consumption of the acquisition devices has to be low in order to stay in stand-by mode without stressing the battery too much, in order to be able to capture an ECU's start-up behavior.

The Transmission Control Protocol (TCP) is one of the core protocols of the Internet Protocol Suite. TCP is one of the two original components of the suite, complementing the Internet Protocol (IP), and therefore the entire suite is commonly referred to as TCP/IP. TCP provides reliable, ordered delivery of a stream of octets from a program on one computer to another program on another computer. TCP is the protocol used by major Internet applications such as the World Wide Web, email, remote administration and file transfer. Other applications, which do not require reliable data stream service, may use the User Datagram Protocol (UDP), which provides a datagram service that emphasizes reduced latency over reliability.

The protocol corresponds to the transport layer of TCP/IP suite. TCP provides a communication service at an intermediate level between an application program and the Internet Protocol (IP). That is, when an application program desires to send a large chunk of data across the Internet using IP, instead of breaking the data into IP-sized pieces and issuing a series of IP requests, the software can issue a single request to TCP and let TCP handle the IP details.

IP works by exchanging pieces of information called packets. A packet is a sequence of octets and consists of a header followed by a body. The header describes the packet's destination and, optionally, the routers to use for forwarding until it arrives at its destination. The body contains the payload data.

Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the application program. Thus, TCP abstracts the application's communication from the underlying networking details.

TCP is utilized extensively by many of the Internet's most popular applications, including the World Wide Web (WWW), E-mail, File Transfer Protocol, Secure Shell, peer-to-peer file sharing, and some streaming media applications.

TCP is a reliable stream delivery service that guarantees that all bytes received will be identical with bytes sent and in the correct order. Since packet transfer is not reliable, a technique known as positive acknowledgment with retransmission can be used to guarantee reliability of packet transfers. This fundamental technique requires the receiver to respond with an acknowledgment message as it receives the data. The sender keeps a record of each packet it sends. The sender also keeps a timer from when the packet was sent, and retransmits a packet if the timer expires before the message has been acknowledged. The timer is needed in case a packet gets lost or corrupted.

TCP consists of a set of rules: for the protocol, that is used with the Internet Protocol, and for the IP, to send data "in a form of message units" between computers over the Internet. While IP handles actual delivery of the data, TCP keeps track of the individual units of data transmission, called segments that a message is divided into for efficient routing through the network. For example, when an HTML file is sent from a Web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. Even though every packet has the same destination address, they can be routed on different paths through the network. When the client program on the destination computer receives them, the TCP layer (Transport Layer) reassembles the individual segments and ensures they are correctly ordered and error free as it streams them to an application.

Hereinafter the TCP segment structure is described. Transmission Control Protocol accepts data from a data stream, segments it into chunks, and adds a TCP header creating a TCP segment. The TCP segment is then encapsulated into an Internet Protocol (IP) datagram. A TCP segment is "the packet of information that TCP uses to exchange data with its peers."

The term TCP packet, though sometimes informally used, is not in line with current terminology, where segment refers to the TCP PDU (Protocol Data Unit), datagram to the IP PDU and frame to the data link layer PDU.

Processes transmit data by calling on the TCP and passing buffers of data as arguments. The TCP packages the data from these buffers into segments and calls on the internet module (e.g. IP) to transmit each segment to the destination TCP.

A TCP segment consists of a segment header and a data section. The TCP header contains 10 mandatory fields, and an optional extension field (Options, orange background in table).

The data section follows the header. Its contents are the payload data carried for the application. The length of the data section is not specified in the TCP segment header. It can be calculated by subtracting the combined length of the TCP header and the encapsulating IP header from the total IP datagram length (specified in the IP header).

| TCP Header | | | | | |
|---|---|---|---|---|---|
| Offsets | Octet | 0 | 1 | 2 | 3 |
| Octet | Bit | 0 1 2 3 4 5 6 7 | 8 9 10 11 12 13 14 15 | 16 17 18 19 20 21 22 23 | 24 25 26 27 28 29 30 31 |
| 0 | 0 | Source port | | Destination port | |
| 4 | 32 | Sequence number | | | |
| 8 | 64 | Acknowledgment number (if ACK set) | | | |
| 12 | 96 | Data offset / Reserved 0 0 0 / NS CWR ECE URG ACK PSH RST SYN FIN | | Window Size | |
| 16 | 128 | Checksum | | Urgent pointer (if URG set) | |
| 20 ... | 160 ... | Options (if Data Offset > 5, padded at the end with "0" bytes if necessary) ... | | | |

Source port (16 bits)—identifies the sending port
Destination port (16 bits)—identifies the receiving port
Sequence number (32 bits)—has a dual role:
  If the SYN flag is set (1), then this is the initial sequence number. The sequence number of the actual first data byte and the acknowledged number in the corresponding ACK are then this sequence number plus 1.
  If the SYN flag is clear (0), then this is the accumulated sequence number of the first data byte of this packet for the current session.
Acknowledgment number (32 bits)—if the ACK flag is set then the value of this field is the next sequence number that the receiver is expecting. This acknowledges receipt of all prior bytes (if any). The first ACK sent by each end acknowledges the other end's initial sequence number itself, but no data.
Data offset (4 bits)—specifies the size of the TCP header in 32-bit words. The minimum size header is 5 words and the maximum is 15 words thus giving the minimum size of 20 bytes and maximum of 60 bytes, allowing for up to 40 bytes of options in the header. This field gets its name from the fact that it is also the offset from the start of the TCP segment to the actual data.
Reserved (3 bits)—for future use and should be set to zero
Flags (9 bits) (aka Control bits)—contains 9 1-bit flags
  NS (1 bit)—ECN-nonce concealment protection (added to header by RFC 3540).
  CWR (1 bit)—Congestion Window Reduced (CWR) flag is set by the sending host to indicate that it received a TCP segment with the ECE flag set and had responded in congestion control mechanism (added to header by RFC 3168).
  ECE (1 bit)—ECN-Echo indicates
  If the SYN flag is set (1), that the TCP peer is ECN capable.
  If the SYN flag is clear (0) that a packet with Congestion Experienced flag in IP header set is received during normal transmission (added to header by RFC 3168).
  URG (1 bit)—indicates that the Urgent pointer field is significant
  ACK (1 bit)—indicates that the Acknowledgment field is significant. All packets after the initial SYN packet sent by the client should have this flag set.
  PSH (1 bit)—Push function. Asks to push the buffered data to the receiving application.
  RST (1 bit)—Reset the connection
  SYN (1 bit)—Synchronize sequence numbers. Only the first packet sent from each end should have this flag set. Some other flags change meaning based on this flag, and some are only valid for when it is set, and others when it is clear.
  FIN (1 bit)—No more data from sender
Window size (16 bits)—the size of the receive window, which specifies the number of bytes (beyond the sequence number in the acknowledgment field) that the sender of this segment is currently willing to receive (see Flow control and Window Scaling)
Checksum (16 bits)—The 16-bit checksum field is used for error-checking of the header and data
Urgent pointer (16 bits)—if the URG flag is set, then this 16-bit field is an offset from the sequence number indicating the last urgent data byte
Options (Variable 0-320 bits, divisible by 32)—The length of this field is determined by the data offset field. Options have up to three fields: Option-Kind (1 byte), Option-Length (1 byte), Option-Data (variable). The Option-Kind field indicates the type of option, and is the only field that is not optional. Depending on what kind of option we are dealing with, the next two fields may be set: the Option-Length field indicates the total length of the option, and the Option-Data field contains the value of the option, if applicable. For example, an Option-Kind byte of 0x01 indicates that this is a No-Op option used only for padding, and does not have an Option-Length or Option-Data byte following it. An Option-Kind byte of 0 is the End Of Options option, and is also only one byte. An Option-Kind byte of 0x02 indicates that this is the Maximum Segment Size option, and will be followed by a byte specifying the length of the MSS field (should be 0x04). Note that this length is the total length of the given options field, including Option-Kind and Option-Length bytes. So while the MSS value is typically expressed in two bytes, the length of the field will be 4 bytes (+2 bytes of kind and length). In short, an MSS option field with a value of 0x05B4 will show up as (0x02 0x04 0x05B4) in the TCP options section.
Padding—The TCP header padding is used to ensure that the TCP header ends and data begins on a 32 bit boundary. The padding is composed of zeros.
Some options may only be sent when SYN is set; they are indicated below as[SYN]. Option-Kind and standard lengths given as (Option-Kind, Option-Length).

0 (8 bits)—End of options list 1 (8 bits)—No operation (NOP, Padding) This may be used to align option fields on 32-bit boundaries for better performance.

2,4,SS (32 bits)—Maximum segment size (see maximum segment size)[SYN]

3,3,S (24 bits)—Window scale (see window scaling for details)[SYN]

4,2 (16 bits)—Selective Acknowledgement permitted. [SYN] (See selective acknowledgments for details)

5,N,BBBB,EEEE, . . . (variable bits, N is either 10, 18, 26, or 34)—Selective ACKnowledgement (SACK). These first two bytes are followed by a list of 1-4 blocks being selectively acknowledged, specified as 32-bit begin/end pointers.

8,10,TTTT,EEEE (80 bits)—Timestamp and echo of previous timestamp (see TCP timestamps for details)

14,3,S (24 bits)—TCP Alternate Checksum Request.[SYN]

15,N, . . . (variable bits)—TCP Alternate Checksum Data.

(The remaining options are obsolete, experimental, not yet standardized, or unassigned)

A number of applications with different quality of service (QoS) needs rely on TCP as an underlying reliable or UDP as an underlying low latency transport mechanism:

High throughput streamed measurement data transport using application specific automotive protocols with data rates in the range of tens of Mbytes/sec on a single TCP connection.

Low latency and low jitter streamed measurement data transport for function in the loop (FIL) prototyping use cases using UDP.

Transaction based control, calibration and diagnostics services with low latency demands to ensure low transaction round trip times using either TCP or UCP.

Standard best effort TCP/IP services like http, ftp or terminal emulation.

In many cases these applications co-exist on a single embedded acquisition device, and each application specific and service aware automotive protocol requires its own TCP connection.

TCP/IP is mostly implemented in software and runs in the CPU's supervisor mode (kernel space) as an operating system service. However, software based protocol implementations principally suffer from frame rate limitations due to the high amount of context switches and the amount of work that has to be performed for each received or transmitted frame. This is particular true for small embedded systems with restricted CPU performance which are connected to a high throughput, low latency Gigabit Ethernet link with its very high frame rate.

Various methods have been proposed in the prior art up to now in order to improve the ratio of consumed CPU processing power per frame event. The most popular of these methods, are:

Offload engines

Offload engines try to reduce the number of operations to be performed per IP frame, e.g. by calculating header and payload checksums in hardware.

This approach reduces the amount of processing power per event but it does not reduce the frame rate for the software. The problem of too many context switches persists.

Interrupt throttling or interrupt concatenation

The number of context switches is reduced by concatenating the handling for multiple frame arrivals into a single interrupt service action.

Interrupt throttling helps a lot in reducing the number of context switches per time unit. However, because it operates on link layer (Ethernet) level it is not service aware and introduces undesired latency to all services.

Use of Jumbo Frames

Jumbo frames are Ethernet frames with an extended length of typically up to 9600 Byte instead of the standard 1518 Byte. This is supposed to reduce the frame rate by allowing larger TCP segment sizes.

Jumbo frames have never been standardized by IEEE 801.3 and are seldom used in local area networks (LAN) and almost never used in conjunction with TCP. They have to be supported at both ends of the link and are not guaranteed to pass every Ethernet bridged or IP routed network. A TCP receiver can even force a Jumbo frame capable TCP sender to send smaller TCP segments by using the corresponding TCP maximum segment size option.

Multicore Technology

Parallel packet processing on a multicore CPU improves all-over packet throughput of a computer considerably.

This technology is only beneficial in the case of independent packet conversations. A single conversation like a TCP connection does not profit from multiple cores, because the cores have to respect the packet sequence which finally leads to a serialized processing of packets on multiple cores, which becomes even worse, because the conversation jumps between the cores; the utilization of the CPU core's level 1 caches and system performance degrades.

Standalone TCP hardware implementations (ASIC or FPGA IP)

Standalone TCP hardware implementations provide a complete, but monolithic TCP/IP stack implementation in hardware. Such an implementation shows typically a tight integration of TCP and IP functionality towards the link layer network including address resolution protocol (ARP). It offers a simple streamed data interface towards the client layer and a socket like control interface towards connection management.

Client layer data passes these components by value. In order to handle a reasonable number of TCP connections standalone TCP in hardware implementations require sufficient private data storage and a corresponding buffer management for the retransmission and the reorder buffers. Since the data storage and the buffer management are externally not accessible, any service aware client layer (e.g. XCP on Ethernet) must implement its own buffering schemes. This leads to increased memory demands. A high bit toggle rate results in high system power consumption. The tight integration of TCP, IP and ARP into a monolithic component complicates multiplexing and de-multiplexing of hardware based and software based packet traffic.

The client layer is one of several application layers, where a user accesses an application. An application may require any type of client. For example, data communication between an ECU and a device (e.g. an embedded acquisition device) is performed in the client layer. The transport layer provides end-to-end communication services for applications within a layered architecture of network components and protocols. For example, data communication between a device (e.g. an embedded acquisition device) and an external personal computer is performed in the transport layer.

The standardized Transport Control Protocol (TCP) is a core component in interface modules required for the reliable transport of measurement, calibration and diagnostics (MCD) data between the ECU and the MCD application software. Upcoming customer data throughput requirements cannot be fulfilled with the current paradigm of software based transport functions in conventional embedded ECU interface modules with a necessarily restricted CPU performance. The same restrictions will apply to the ECUs themselves with the introduction of automotive Ethernet.

The discussion of the available solutions for TCP acceleration shows that none of these solutions solves the specific TCP in hardware problems of an embedded automotive acquisition device. Therefore, it is an object of the present invention to provide for a fast and reliable data transmission between any two devices in a client layer and/or a transport layer of a communication system, wherein the data transmission is performed according to the TCP. In particular, it is an object of the invention to provide for a fast and reliable MCD data transmission between an automotive ECU and a development software tool, for example running on a personal computer.

BRIEF SUMMARY OF THE INVENTION

The present invention provides a method for transmitting data between any two devices in a client layer and/or a transport layer of a communication system is suggested. The data transmission is performed according to the transport control protocol, referred to hereinafter as TCP. The method is characterized in that the data to be transmitted is buffered in a central storage means and in that a TCP protocol operation block handles references on the transported data stored in the storage means instead of the data itself. Furthermore, a communication system adapted for transmitting data between any two devices in a client layer and/or a transport layer of a communication system is suggested. The data transmission is performed according to the transport control protocol, referred to hereinafter as TCP. The communication system is characterized in that it comprises central storage means for buffering the data to be transmitted and a TCP protocol operation block adapted for handling references on the transported data stored in the storage means instead of the data itself.

Finally, an embedded acquisition device located between any two devices of a communication system, between which data is transmitted in a client layer and/or a transport layer of the communication system, is suggested. The acquisition device is adapted for performing data transmission according to the transport control protocol, referred to hereinafter as TCP. The acquisition device is characterized in that it comprises a TCP protocol operation block adapted for handling references on the data to be transmitted, which is buffered in central storage means of the communication system, instead of the data itself.

In the present patent application the terms "transmitting", "transmission" and "transmitted" are used in their broadest sense comprising data transmission in both directions, that is comprising the sending of data (or frames) in a first direction and the receiving of data (or frames) in the opposite direction.

According to a preferred embodiment of the present invention, measurement, calibration and diagnostics data is transmitted in the communication system between an automotive electronic control unit on the one hand and an automotive development software tool, which runs on an external personal computer, on the other hand. The data transmission is performed across the TCP acquisition device which handles the references on the data to be transmitted, which is buffered in central storage means of the communication system.

The solution presented in this invention achieves wire-speed TCP throughput on a Gigabit Ethernet link and overcomes the specific restriction associated with small embedded systems. The proposed TCP protocol termination is completely implemented in hardware, therefore it is named TCPHW (TCP in hardware). The design is based on the following basic ideas and paradigms:

Segmentation of client layer payload
  The client layer payload is segmented into data chunks of limited size. The data chunks of different client layers are interleaved allowing multiple client layers to utilize a single multi-channel data interface towards TCPHW. This simplifies the implementation of virtually parallel working TCP protocol engines processing multiple connections concurrently for multiple client layer applications.

Segmentation of network layer payload
  Network layer (IP) and link layer (Ethernet) frames are also segmented into data chunks of limited size. Connections terminated by TCPHW and other connections terminated in software stacks can easily utilize the same multi-channel interface toward the network.

Concurrent protocol processing of packets
  Serializing client and network payload segments simplifies concurrent protocol processing for multiple connections. Segments belonging to different connections are processed in a time-multiplexed way using oversampling techniques.
  By implementing hardware support to save processing states the context switching overhead can be eliminated. The design ensures that processing power is instantly available for each received packet at any time.
  Since each segment and packet event is instantly processed, event throttling and associated latency are avoided.

Working on data references rather than data itself
  TCP end points communicate via TCP sequence numbers, which can easily be derived from data segment lengths indicators; there is no need for the TCP function to count the payload bytes by itself.
  The retransmission and recorder buffers store data references rather than data values. For instance, using 8 byte descriptors for segments of 128 or 256 byte size reduces the amount of data storage by a factor of up to 32. This enables the implementation of socket buffers for multiple TCP instances using internal FPGA RAM, which saves considerable processing performance and power.
  The bit toggle rate on interfaces is largely reduced with the transmission of data references instead of data values. This is particularly true for external interfaces with high pin capacities.

Isolation from network layer
  The TCP functionality is isolated from UDP, IP and ARP functionality.
  The TCP implementation becomes more light-weighted and avoids multiple stages of packet multiplexing towards the link layer. This simplifies the co-existence of hardware and software stacks.

DETAILED DESCRIPTION OF THE INVENTION

Figure 1:
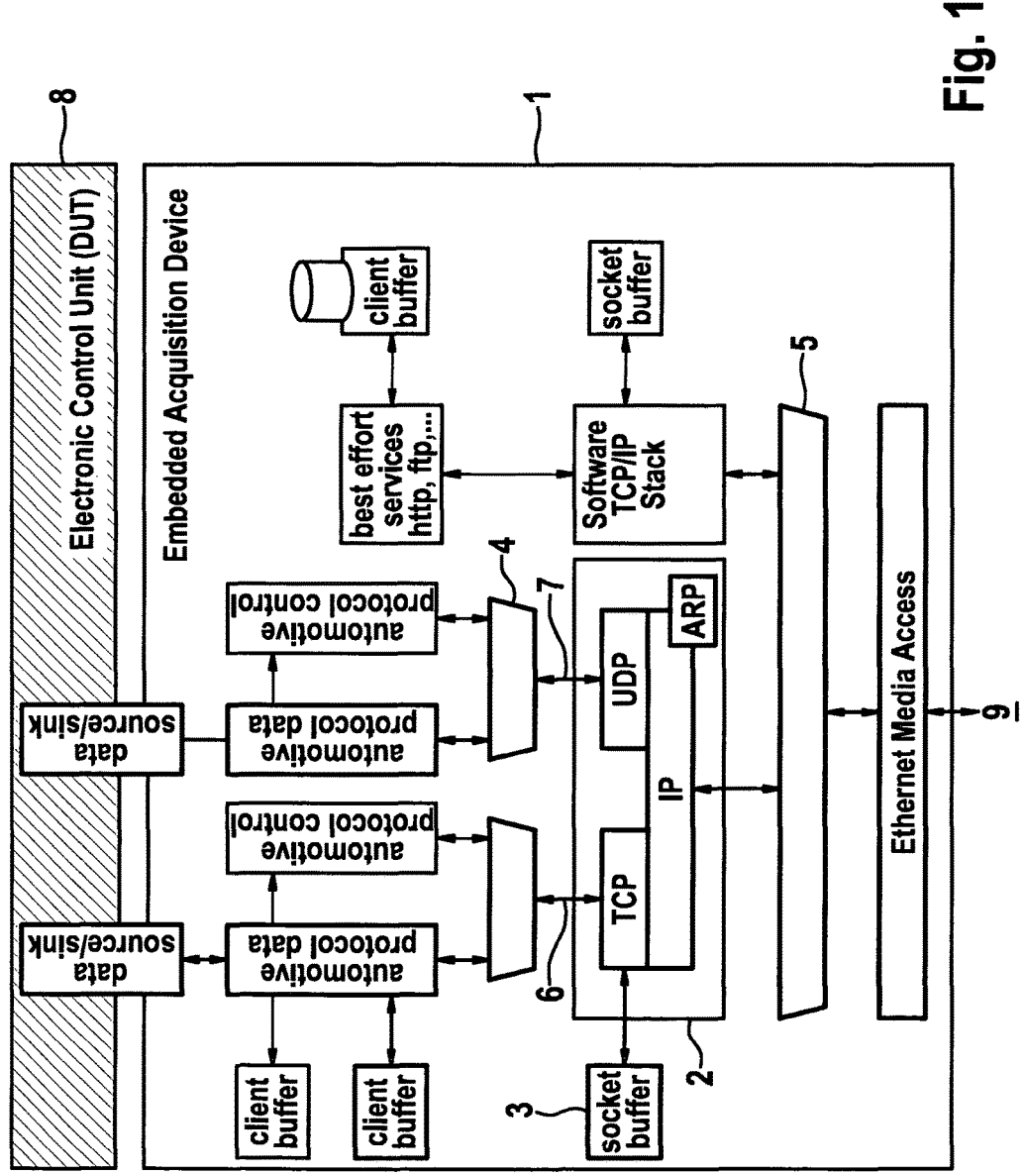
FIG. 1 shows a standard TCP in hardware solution known from the prior art.

FIG. 1 shows a standard TCP in hardware solution known from the prior art. In particular a system overview of an embedded acquisition device 1 with a standalone TCP in hardware component 2 is shown. This solution can be implemented as an ASIC or a FPGA IP. The known solution provides a complete, but monolithic TCP/IP stack implementation in hardware. Such an implementation shows typically a tight integration of TCP and IP functionality towards the link layer network including address resolution protocol (ARP). It offers a simple streamed data interface towards the client layer and a socket like control interface towards connection management. However, client layer data passes these components by value that is the actual raw data is processed. In order to handle a reasonable number of TCP connections standalone TCP in hardware implementations require sufficient private data storage (e.g. socket buffer 3) and a corresponding buffer management for the retransmission and the reorder buffers. Since the data storage 3 and the buffer management are externally not accessible, any service aware client layer (e.g. XCP on Ethernet) must implement its own buffering schemes. This leads to increased memory demands. A high bit toggle rate results in high system power consumption. The tight integration of TCP, IP and ARP into a monolithic component complicates multiplexing and de-multiplexing of hardware based and software based packet traffic.

In FIG. 1 reference sign 4 indicates client layer multiplexers/demultiplexers and reference sign 5 indicates a packet multiplexer/demultiplexer. Reference sign 6 indicates high throughput services between the TCP in hardware component 2 and one of the client layer multiplexers/demultiplexers 4 for TCP and reference sign 7 indicates low latency services between the TCP in hardware component 2 and one of the client layer multiplexers/demultiplexers 4 for UDP.

Figure 2:
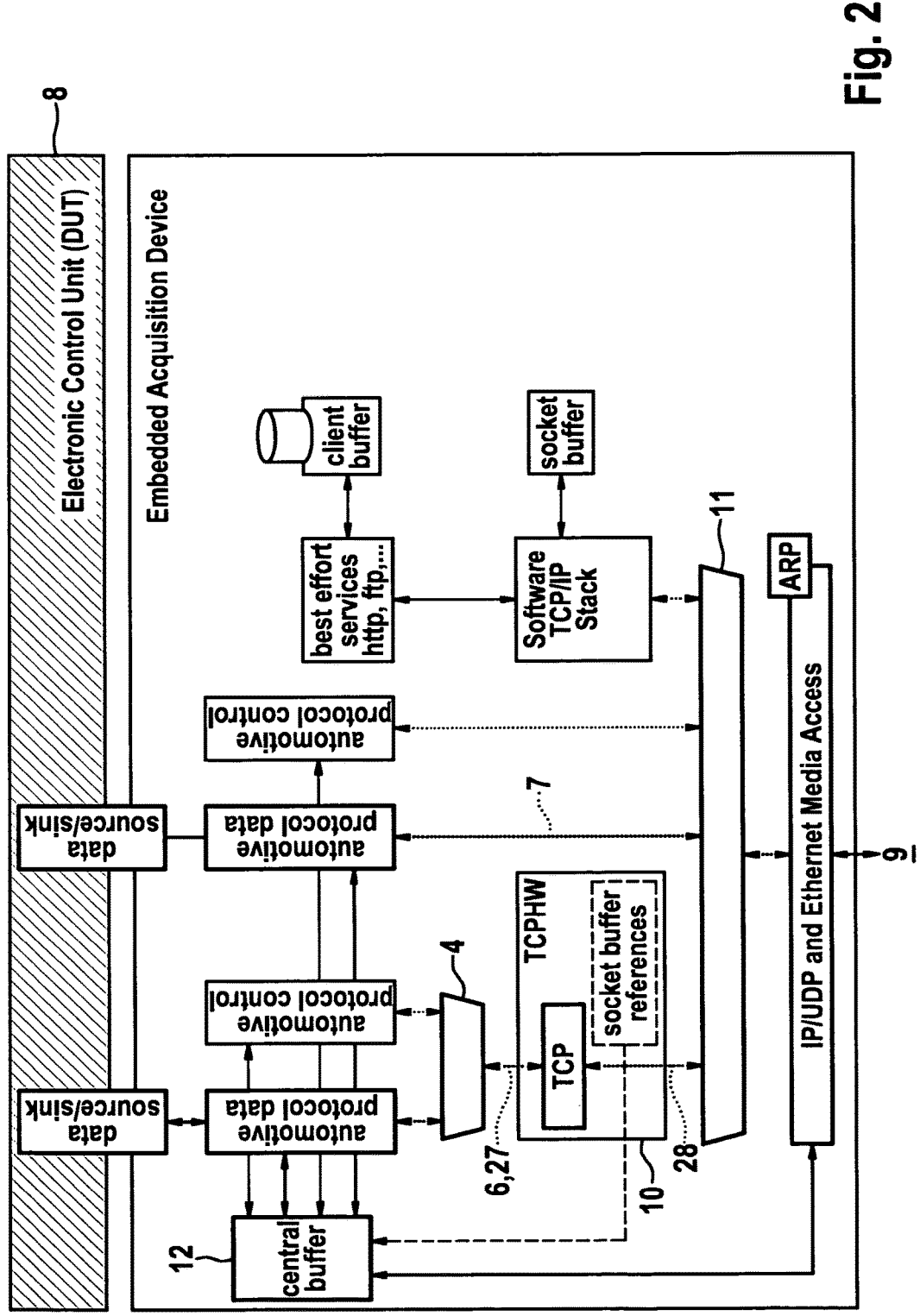
FIG. 2 shows the TCP in hardware solution according to the present invention.

A preferred embodiment of the solution according to the present invention is shown in FIG. 2. It achieves wire-speed TCP throughput on a Gigabit Ethernet link and overcomes the specific restriction associated with small embedded systems. The proposed TCP protocol termination is completely implemented in hardware, therefore it is named TCPHW (TCP in hardware). The design is based on the following basic ideas and paradigms:
Segmentation of client layer payload
Segmentation of network layer payload
Concurrent protocol processing of packets
Operating on data references rather than data itself
Isolation from network layer from UDP, IP and ARP functionality In FIG. 2 reference sign 4 indicates client layer multiplexer/demultiplexer and reference sign 11 indicates a multi-layer multiplexer/demultiplexer. The TCPHW component (embedded acquisition device) according to the present invention is designated by reference sign 10. Reference sign 6 indicates high throughput services between the TCPHW component 10 and the client layer multiplexer/demultiplexer 4 and reference sign 7 indicates low latency services between an automotive protocol data block and the multilayer multiplexer/demultiplexer 11. Reference sign 12 indicates a central buffer, which is commonly used across all communication layers and serves for storing the actual raw data. The central buffer 12 of the present invention replaces the socket buffer 3 and the plurality of client buffers in the prior art of FIG. 1. The TCPHW component 10 of the present invention handles and processes only references on the data stored in the central buffer 12 instead of the actual raw data. The actual raw data is exchanged directly between the IP/UDP and Ethernet Media Access block and the central buffer 12 without ever reaching the TCPHW component 10. Dashed lines between the functional blocks of FIG. 2 indicate an interface by reference with a low toggle rate. Continuous lines between the functional blocks indicate an interface by value with a low toggle rate. Finally, bold lines between the functional blocks indicate an interface by value with a high toggle rate.

The present invention solves the prior art problems by changing the former paradigm of software based protocol implementation towards a consequent implementation of parallelized hardware based transport functions. This invention describes methods and principles for integrating a light weighted, scalable and high performance purely hardware based TCP component into ECUs 8 even supporting automotive Ethernet. These principles and methods are the key differentiators to the few available, heavy weighted TCP in hardware solutions on the market, none of which satisfies the special requirements of embedded automotive devices.

The Transport Control Protocol (TCP) satisfies customer requirements for a reliable transport of measurement, calibration and diagnostics (MCD) data between embedded ECU interface devices and off-the-shelf personal computers (PCs) running a measurement application software tool 9, e.g. INCA from ETAS GmbH.

In the prior art, the TCP protocol functionality is provided by the underlying operating system software, either QNX® from Research In Motion Corp. (RIM) or Embedded Linux within the embedded device of Microsoft Windows® within the PC.

Measurement applications for next generation automotive ECUs 8 request measurement data transport rates of at least 30 MByte/s or even higher. Low latency and low jitter prototyping applications are required to co-exist.

It has been found that such an increase in data throughput by a factor of 5 to 10 in respect to the current solutions can only be achieved by removing frame rate awareness completely from software and by implementing the protocol stack in hardware.

Available TCP in hardware solutions have been investigated with the following results:
The only existing ASIC solution (max. 12.5 MByte/sec) from WIZNET, Korea does neither support nor have a roadmap for Gigabit Ethernet and is missing a second source.
All existing FPGA based TCP in hardware solutions are standalone implementations requiring TCP private data buffering which adds considerable complexity, cost and power consumption. None of them provide extended support for service multiplexing on client or network side. The amount of supported connections is either too high or too low. Some implementations are missing features or are even not standard compliant. Scalability cannot be controlled.

The present invention overcomes these restrictions by implanting one or more of the following features:

Using shared single data buffer with client and network layer side multiplexers reducing power consumption and cost.

Providing wire-speed performance of up to 125 MByte/sec.

Further reduction of power consumption by operating on data pointers rather than raw data which reduces the system's toggle rate by a factor of up to 16.

Providing means for a seamless integration of the TCP in hardware solution between higher layer (client side) protocols and lower layer (network side) protocols.

Not adding latency or jitter for prototyping applications.

Allowing co-existence of hardware and software based protocol stacks.

Controllable scalability.

The present invention concentrates on integration methods and principles that enable an optimized TCP in hardware implementation. The internals of the TCP functions are developed externally and are therefore not part of this invention.

Figure 3:
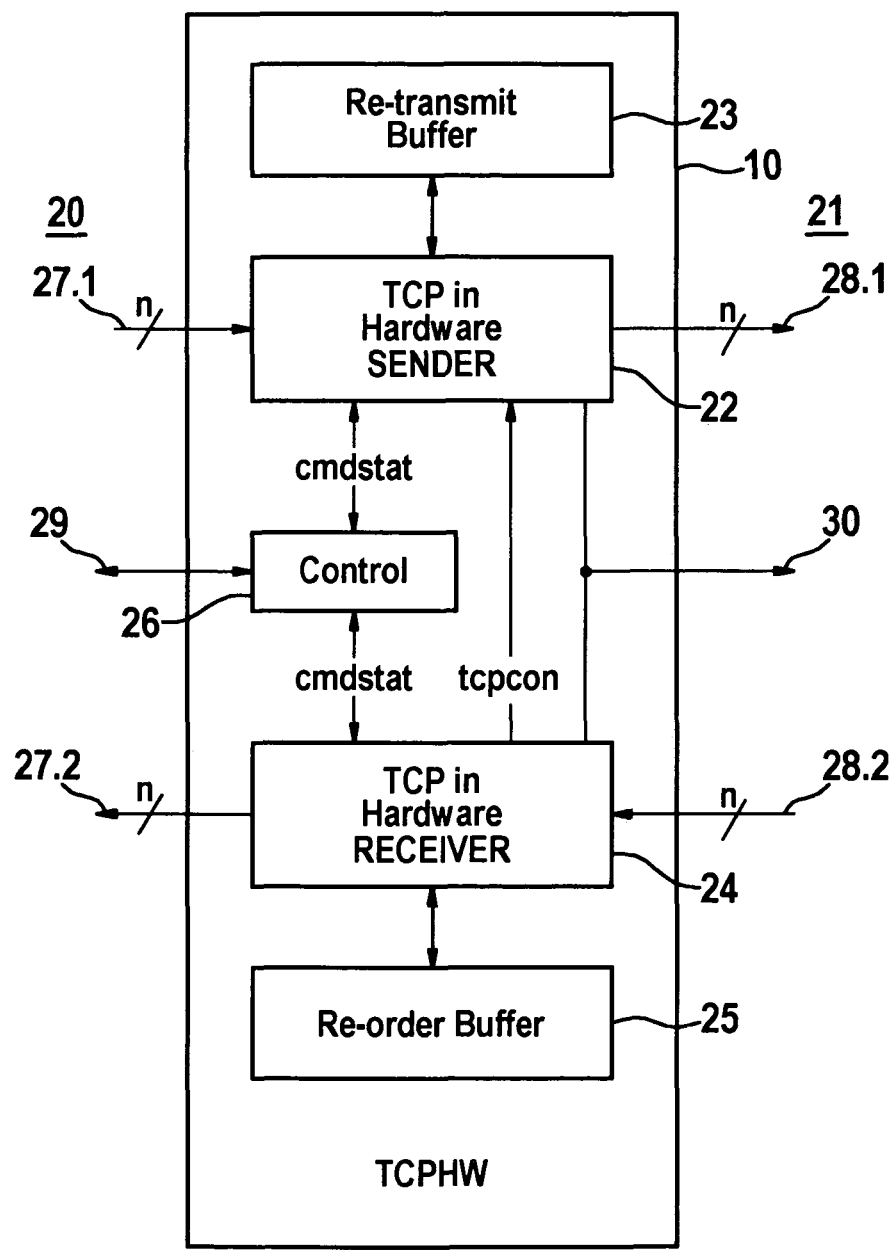
FIG. 3 shows an integrated TCP in hardware component implemented in the solution according to the present invention.

The TCP in hardware (TCPHW) component 10 is shown in FIG. 3. The component 10 performs standard compliant TCP protocol operation. It connects to client layer 20 and network layer 21 of the data plane and to the control plane using the following well defined interfaces:

Client Layer Interface 27
Network Layer Interface 28
Control Interface 29
Descriptor Pool Interface 30

These interfaces are serviced by the following major building blocks

TCP sender 22 with re-transmission buffer 23
TCP receiver 24 with re-ordering buffer 25 and
Control 26

The building blocks are interconnected by the following internal interfaces:

Command/Status Interface cmdstat
TCP Connection Interface tcpcon

A descriptor is a container for transporting and storing references to external data buffers, for example central buffer 12. Each descriptor describes a single client or network layer data segment of limited size. It carries the following information:

Buffer index
  A user defined index to an external data buffer. TCP transports this information transparently.
Length of segment
  Length of valid data contained in this segment. TCP uses this information to calculate TCP sequence numbers.
Offset within segment
  An offset pointing to the first valid payload byte within the buffer. TCP transports this information transparently.
Length of Extension Word
  Length of user defined extension word. TCP transports this information transparently.

Extension Word
  Client or network layer defined extension word. TCP transports this information transparently.

Hereinafter the external interfaces are described in detail.

The client layer interface 27 is a bi-directional multi-channel interface connecting n TCP functions (connections) of the TCPHW 10 with client layers. It comprises a client layer transmit interface 27.1 and a client layer receive interface 27.2. The interface 27 carries client payload in form of descriptors to data segments of limited size. Each channel represents an independently operating TCP connection and is interleaved with other channels on a per segment base.

The client layer interface 27 is a master/slave interface. The TCPHW 10 is the slave.

The TCP sender 22 is allowed to backpressure traffic from the client layer receive interface 27.2 on a per channel base. Backpressure may become active for different reasons:

The near end sender's transmit window closes because no acknowledges are received due to lost frames.

The far end receiver closes the TCP window because received data is not processed by the far end client layer.

The TCP connection slows down because of contention with other services or connections on the Ethernet egress interface.

The TCP connection reduces its internal processing speed.

The TCP receiver 24 must honor backpressure asserted by the client layer by not emptying its reorder buffer 25 and reducing the receive window size advertised to the far end TCP sender.

The network layer interface 28 is a bi-direction multi-channel interface connecting n TCP functions (connections) of the TCPHW 10 with the network layer's IP and Ethernet interface. It comprises a network layer transmit interface 28.1 and a network layer receive interface 28.2. The interface 28 operates by reference carrying the TCP segment payload in form of descriptors to data segments of limited size. Each channel represents an independently operating TCP connection and is interleaved with other channels on a per segment base. The segmentation and classification of TCP traffic by IP address and port number and the mapping of connections to channels is done outside the TCPHW component 10.

It is noted that the TCPHW 10 passes the segments received from the client layer (over client layer interface 27) to the network layer (over network layer interface 28) without any changes that is without processing them.

The TCP segment's payload is transferred by reference. The TCP segment's header (TCP protocol header) is generated or consumed by the TCP protocol function and must be transferred by value.

The network layer interface 28 is a master/slave interface with the TCPHW 10 acting as a slave. It is noted that this differs from standalone implementations (see FIG. 1) where the IP layer is closely tied to the TCP layer and acts as a master towards a link layer MAC slave.

The TCP sender 22 must honor backpressure as asserted by the network layer on a per channel base.

The TCP receiver 24 is allowed to assert backpressure towards the network layer, either per channel or commonly for all channels. In order to avoid interference between multiple flow control mechanisms (link layer flow control with Ethernet PAUSE frames, network layer interface backpressure and TCP end-to-end flow control) it is recommended to not rely on network layer receive interface 28.2 backpressure. The TCPHW 10 must be fast enough to accept any data from the network layer interface 28 at wire speed.

The control interface 29 is a memory mapped register interface to the software. It provides the following services:

Activate/Deactivate (global)
    Software globally activates or deactivates the complete TCPHW 10. Default: deactivated Reset (global)
    Software resets a running TCPHW 10 into its power-up state. All registers are loaded with their default values.

Local TCP Port Configuration (per connection)
    Set the local TCP/IP port for a given connection.

Remote TCP Port Configuration (per connection)
    Active open (client): Set remote TCP port number
    Passive open (server): Get remote TCP port number Commands to TCP protocol engines (per connection)
    Software sends one of the following commands to the TCPHW:
        "passiveOpen": put TCP state machine into LISTEN state
        "activeOpen": put TCP state machine into SYN_SENT state
        "close": close the connection locally; results either in a transition to FIN_WAIT1, CLOSE_WAIT or LAST_ACK
        "deleteTcb": immediately reset the connection and transfer the local TCP state machine into the CLOSED state. If the connection was not already in the CLOSED or TIME_WAIT state, this action also sends a TCP_RST control to the remote host.
    Commands are explicitly confirmed to the software Status from TCP protocol engines (per connection)
    Software reads the current status for each connection. Possible states are: CLOSED, LISTEN, SYN_RCVD, SYN_SENT, ESTABLISHED, CLOSE_WAIT, LAST_ACK, FIN_WAIT1, FIN_WAIT2, CLOSING, TIME_WAIT Maximum Send Segment Size (per connection)
    Software sets the maximum size of a TCP send segment per connection. Default: 356 Byte Maximum Receive Segment Size (per connection)
    Software sets the maximum size of a TCP receive segment per connection. This value is announced to the far end during connection setup. Default: 1480 Byte Enable/Disable Nagle's Algorithm (per connection)
    Software disables Nagles's Algorithm on the given connection. Default: enable Configure Delayed Acknowledgement Algorithm (per connection)
    Two values are used by software to control the delayed acknowledgement algorithm:
        Acknowledge Count (per connection) defines the number of segments that must have been received before an immediate acknowledgement is sent.
        Maximum Delay (per connection) defines the maximum delay a sender must wait for an acknowledgement.

Notification and Interrupts
    The TCPHW sends the following asynchronous notifications to software using interrupts:
    TCP state changed due to remote host control
    TCP state changed due to timer event
    Remote TCP sent FIN
    Remote TCP sent RST
    Slow retransmission timer caused retransmission
    Fast retransmission triggered Buffer Descriptor Interface 30 (or Descriptor Pool Interface): The TCP sender 22 must store descriptors until the corresponding segment has been acknowledged by the far end receiver. Once an acknowledgement has been received, the TCP sender 22 returns the descriptors (references) associated with the acknowledged segments to an external descriptor pool via interface 30.

The TCP receiver 24, on the other hand, must not deliver any TCP content twice to the client layer. Hence, each duplicate received TCP segment must be freed by returning the associated descriptors to an external descriptor pool.

It is noted that neither the TCP receiver 24 nor the TCP sender 22 ever allocates descriptors from the pool.

In any case, when a connection is closed by either the near end or the far end, all descriptors associated with that connection must be returned into the external descriptor pool.

The buffer descriptor interface 30 is a simple synchronous handshake interface providing a single service "free buffer" with two associated parameters: the buffer pool and the index of the buffer within that pool.

The TCPHW component 10 consists of three major building blocks
    TCP Sender 22 and Retransmission Buffer 23,
    TCP Receiver 24 and Reorder Buffer 25, and
    Control 26.

A short black-box description of these building blocks is given hereinafter. The detailed internal design of these building blocks is not within the scope of this invention. However, the external interfaces 27-30 are defined and basic guidelines for the implementation have been discussed above.

TCP Sender 22 and Retransmission Buffer 23: The TCP sender 22 performs standard TCP protocol processing for multiple connections according to the IETF (Internet Engineering Task Force) standards. The connections run concurrently. The TCP sender 22 maintains a retransmission buffer 23 for each connection. This buffer 23 is designed to store TCP segments. Each TCP segment consists of a list of references to data buffers located in external data storage, for example central buffer 12, which is not part of the TCPHW 10. These references originate from the client layer and are encapsulated in a descriptor structure as described above.

Figure 4:
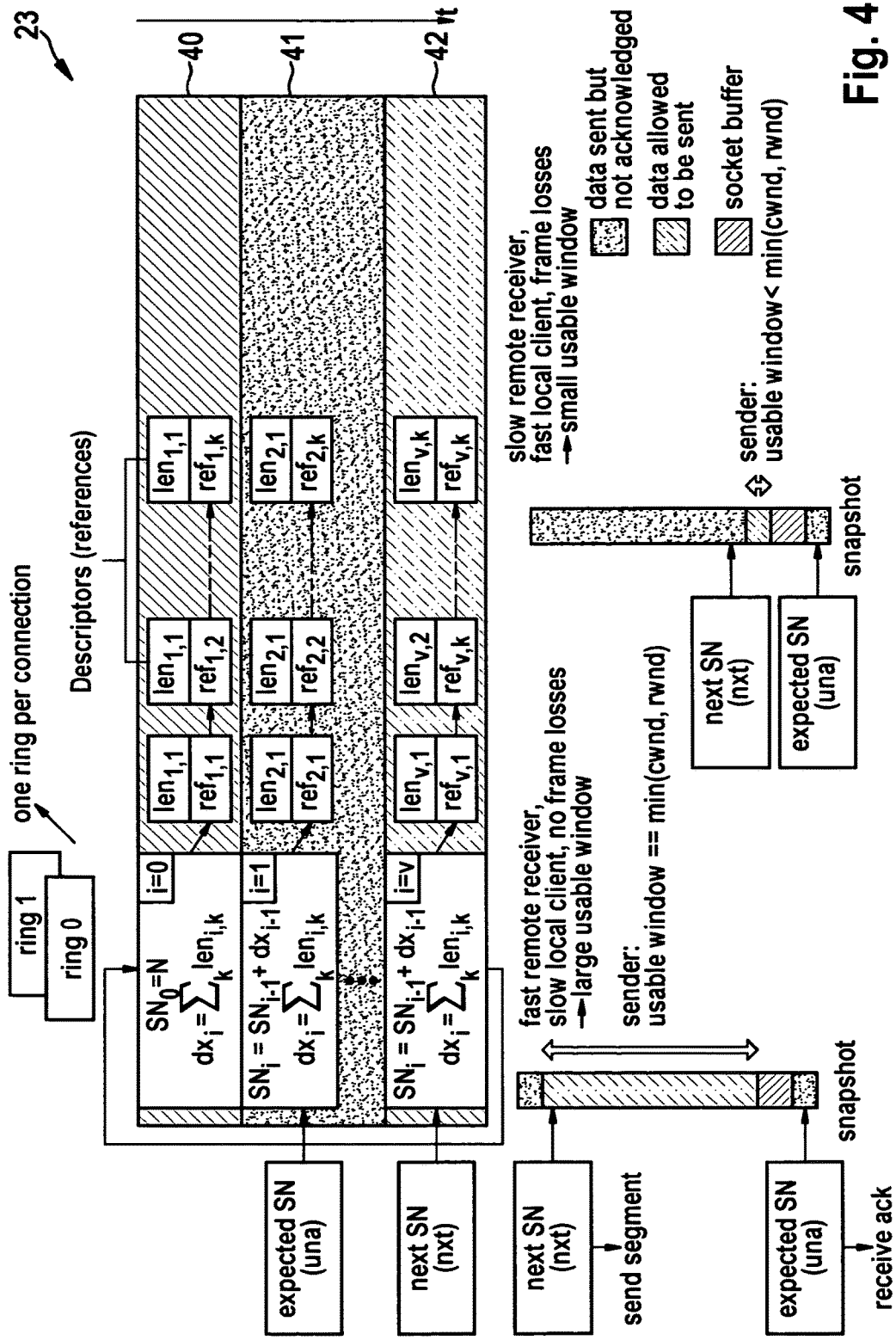
FIG. 4 shows an embodiment of the logical structure of a retransmission buffer.

The retransmission buffer 23 as shown in FIG. 4 has three basic zones:
    Free buffer 40 (shaded with continuous line), which has not yet been filled by the client layer,
    Occupied buffer 41 (dotted) with TCP segments already sent and waiting for acknowledgement by the far end TCP receiver. These TCP segments are held until retransmit or acknowledged. The TCP sender variable expectedSN marks the beginning of this zone. ExpectedSN is updated with each received new acknowledgement sequence number. Acknowledged TCP segments change their color from "dotted" to "shaded with continuous line" and become free buffer. All references associated with a TCP segment have to be returned as quick as possible to the external descriptor pool using the descriptor pool interface for later reuse.
    Occupied buffer 42 (shaded with dotted lines) with data that, if available, is allowed to be sent. The start of this zone is marked by the TCP sender variable nextSN. NextSN is incremented after a TCP segment has been sent towards the network layer. The TCP segment's color changes from "shaded with dotted lines" to "dotted". All references belonging to the corresponding TCP segment are now owned by TCPHW until they are acknowledged and released.

FIG. 4 shows the logical structure of the retransmission buffer 23. Buffer 23 entries are indexed by TCP sequence numbers. The TCP sender 22 constructs sequence numbers by adding the length indicators received within descriptors from the client layer until the maximum segment size MMS of a TCP segment is reached or is almost reached. The detailed behavior depends on Nagle's algorithm settings. If this algorithm is turned on, data is collected as described above. If it is turned off, the TCP sender may or may not collect client data into TCP segments depending on its speed.

It is noted that it may not be possible to optimally fill a TCP segment because adding the length of the next received client layer segment $S_i$ may exceed the maximum segment size MMS. However, the client layer may split segment $S_i$ virtually into sub-segments $S_{i1}$ and $S_{i2}$. Both sub-segments carry the same buffer index but use different offsets into the same external data buffer, e.g. central buffer 12.

The physical size of the retransmit buffer 23 must be large enough to hold sufficient data references for the usable TCP window size which ranges from 0 to min(cwnd, rwnd), where cwnd is the TCP congestion window, and rwnd denotes the advertised receive window size from the far end TCP receiver.

Assuming a congestion free, small local area network with low bit error rates the minimum retransmit buffer size to be supported is dominated by a relatively small round trip time RTT and the desired maintained throughput R of the TCP connection:

$$B_{\mathit{eff}} = R * RTT$$

Example

With R=(30 to 125) MByte/s, RTT=(0.5 to 1) ms a buffer size of $B_{\mathit{eff}}$=(15 to 125) kByte must be supported.

The demand for physical descriptor storage depends on the TCP layer's maximum segment size mss and the client layer's minimum segment length msl.

$$B_{phy} = \frac{B_{\mathit{eff}}}{mss} * \frac{mss}{msl} * k$$

Where k is the size of a descriptor. It is noted that the value of k differs from TCP segment to TCP segment. The segmentation is performed by the client layer.

Example

With mss=1460 Byte, msl=(64 to 256) Byte and k=64 bit the physical storage for references ranges from 480 to 16000 bytes for the above calculated range of effective buffer sizes. A considerable reduction by a factor of up to 24 can be achieved.

TCP Receiver 24 and Reorder Buffer 25: The TCP receiver 24 performs standard TCP protocol processing for multiple connections according to the IETF standards. The connections run concurrently. The TCP receiver 24 maintains a reorder buffer 25 for each connection. This buffer is designed to store TCP segments. Each TCP segment consists of a list of references to data buffers located in an external data storage, for example central buffer 12, which is not part of the TCPHW 10. These references originate from the network layer and are encapsulated in a descriptor structure as described above.

Figure 5:
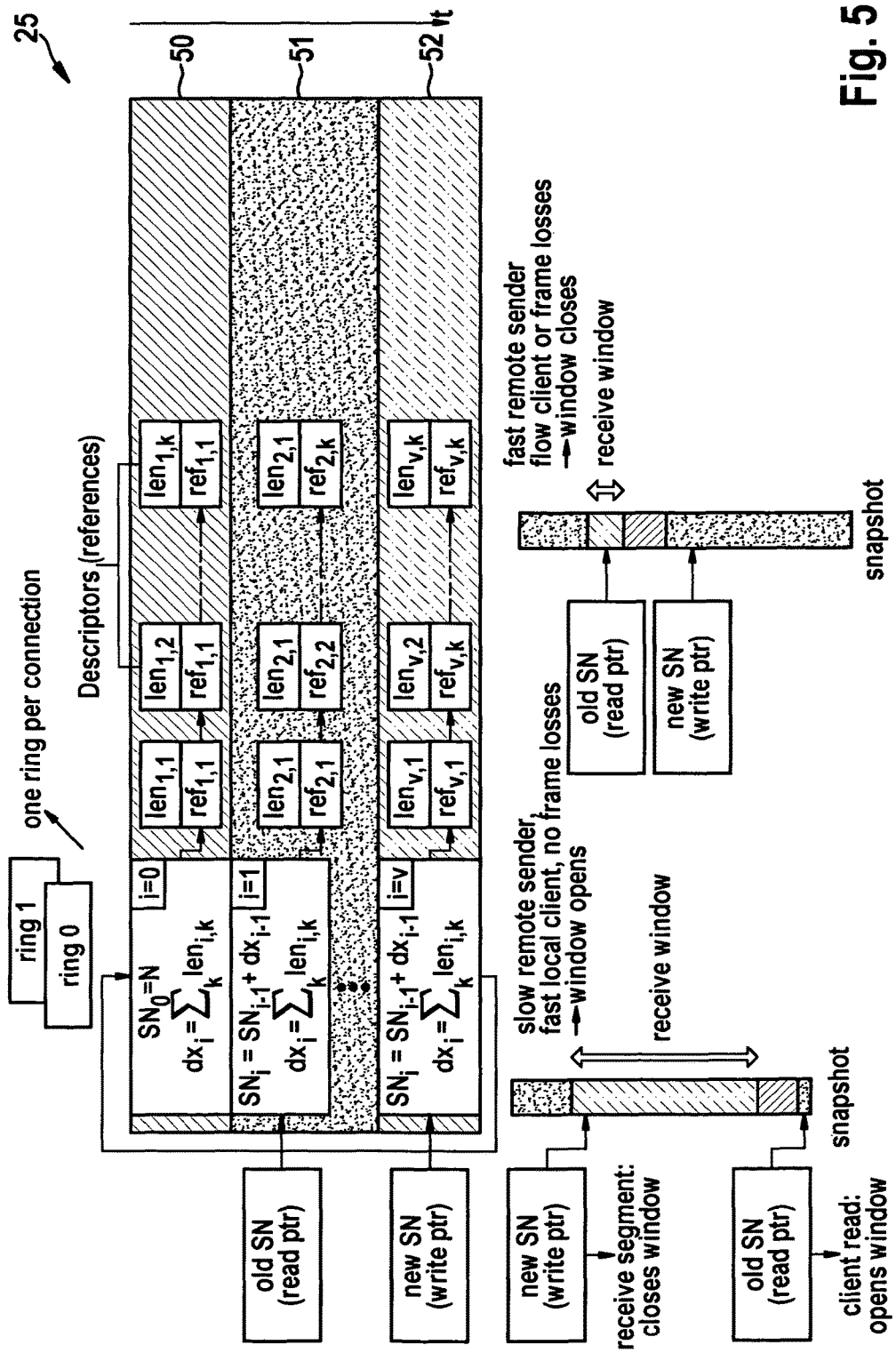
FIG. 5 shows an embodiment of the logical structure of a reorder buffer.

The reorder buffer 25 as shown in FIG. 5 has three basic zones:

Free buffer 50 (shaded with continuous line), which exceeds the defined receive socket buffer size and which will normally not be used.

Occupied buffer 51 (dotted) with already received TCP segments. The data has not yet been consumed by the client layer. This buffer 51 contains segments waiting for consumption by the client. These TCP segments are held until re-ordering is complete. A read pointer oldSN marks the beginning of this zone 51. It advances when the client layer reads data changing the segments color to "shaded with continuous line".

Free buffer 52 (shaded with dotted lines) to receive new data from the network. A write pointer newSN marks the beginning of this zone. It is incremented when TCP segments are received from the network layer changing the segments color from "shaded with dotted lines" to "dotted".

Recording of frames happens in the "dotted" zone. The read pointer oldSN only advances if there are no missing sequence numbers between the current and the next possible position.

FIG. 5 shows the logical structure of the reorder buffer 25. Buffer 25 entries are addressed by TCP sequence numbers. The sequence numbers are received in the TCP header which is transferred by value.

Before entering the TCP receiver, the TCP segment is split into limited sized chunks of data. The references to the corresponding external data storage, for example central buffer 12, are encapsulated in descriptors.

The size of the reorder buffer 25 must be large enough to store references matching the maximum receive window size (receive socket buffer size). The receive window size is the size of the "shaded with dotted lines" zone.

Assuming a receive window (socket buffer) size of (16 to 64) kByte and a typical segment length of 128 bytes for TCT terminated network traffic up to 128 or 512 descriptors of for instance 64 bit each have to be stored in the reorder buffer 25, which results in 1 to 4 kByte physical descriptor storage space.

The control building block provides a register based programming interface to software. Software controlled register outputs control specific functions in the TCP sender and TCP receiver functions, e.g. reset, initiation of an outgoing connect or the notification of incoming connects and error signaling.

It also provides an interface to collect statistics values from the TCPHW data plane functions (TCP sender and TCP receiver). In order to capture a consistent set of statistics values at exactly the same time, software first initiates a capture cycle by setting an appropriate register entry. The control function distributes this command as a capture pulse into the data plane functions. The data plane functions capture running counter values using this capture pulse into corresponding shadow registers which are visible to software via the control function.

Internal Interfaces comprise a Command Status Interface cmdstat and a TCP Connection Interface tcpcon. The command status interface cmdstat carries command and status information between the control function's control registers and the TCP sender and receiver. It also provides means for capturing a consistent set of statistic values as described above. The TCP connection interface tcpcon carries all local sender/receiver information:

Received acknowledgement sequence numbers from receiver to sender

Receive window size advertisement from receiver to sender

Information required to implement a distributed TCP connection state machine involving both TCP sender and TCP receiver.

Figure 6:
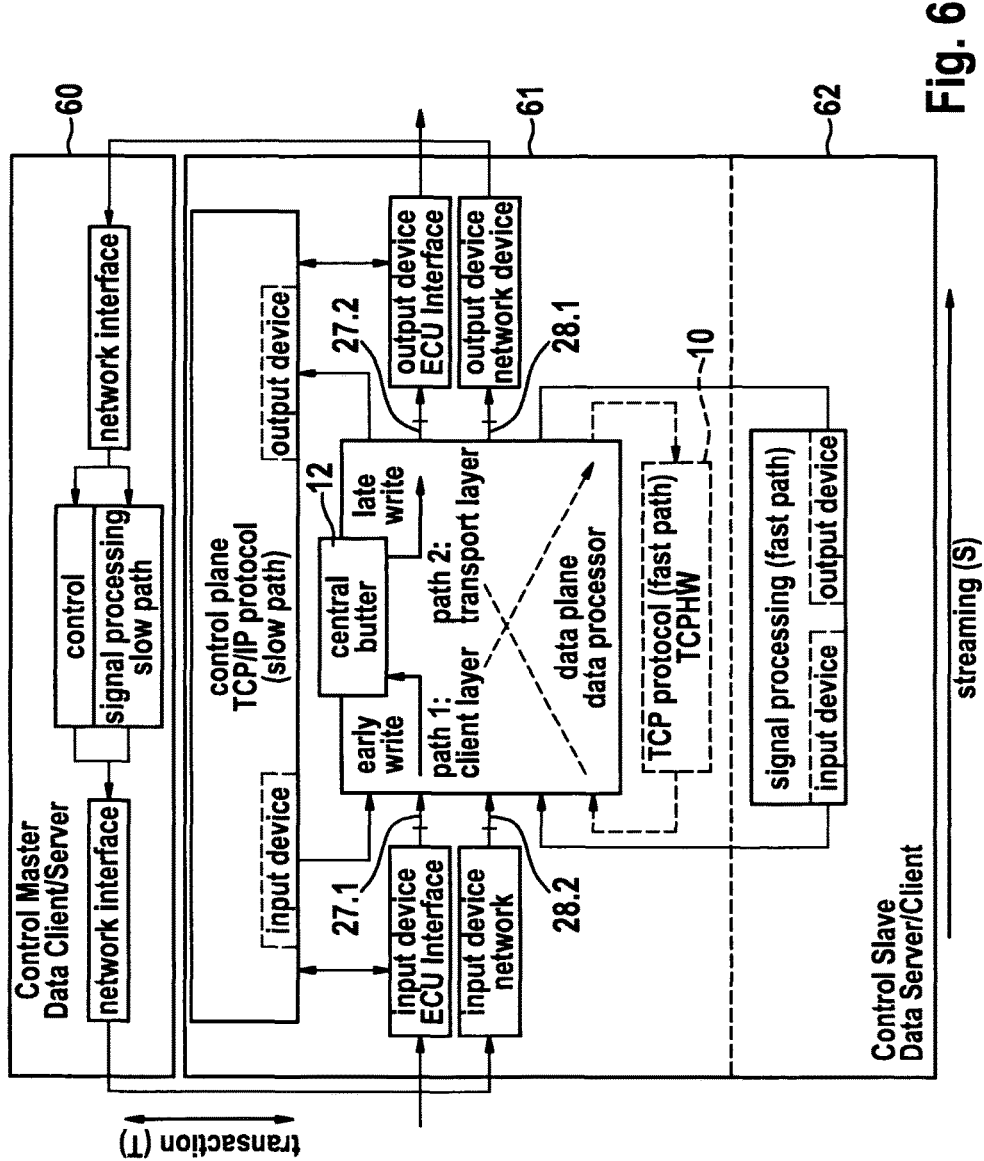
FIG. 6 shows the TCP in hardware solution according to the present invention in conjunction with a hardware data plane (hardware processor).

FIG. 6 shows how the TCPHW component 10 interworks with a multilayer hardware data plane (data processor) in TCP send direction. The multilayer hardware data plane performs the client side and network side multiplexing functions above and below the TCPHW component 10 shown in FIG. 2. The client side multiplexing of FIG. 2 is done in a first processing path (path 1) and the multi-layer multiplexing function of FIG. 2 is done in a second processing path (path 2).

The actual client data is written EARLY into the central buffer 12 before TCP processing and read LATE from the central buffer 12 after TCP processing.

Multiplexing and TCP protocol processing are performed on pointers (=descriptors) rather than on the data itself. In FIG. 6 reference sign 60 designates an Application node. Reference sign 61 indicates an ECU Interface Module and Transport Node and reference sign 62 indicates a Simulation Node. Further, in FIG. 6 arrows with continuous lines indicate a data transfer, for example 128 Byte per time interval T, e.g. 128 Byte/0.2 µs=640 MByte/s. Arrows with dashed lines indicate pointer processing, for example (8 . . . 10) Byte per time interval T, e.g. 8 Byte/0.2 µs=40 MByte. This results in a reduction of the processing rate by factor 16.

Finally, we present a list of key ideas which this invention is based upon. The TCPHW according to the present invention comprises one or more of these key ideas.

Common usage of data buffer across all communication layers
    Other known solutions implement dedicated buffer management for TCP
    Saves cost and power consumption
Isolation of TCP transport layer from network layer (IP)
    Other known solutions bind TCP in HW closely to network (IP) layer and link (Ethernet) layer.
    Enables/simplifies co-existence of hardware and software protocol stack
    Enables/simplifies co-existence of different transport layers on top of common network layer
Operation on references to data rather than raw data itself
    Other known solutions toggle with each data byte
    Reduction of logic toggle rate by a factor of up to 16 (toggle with data segment)
Segmentation of client layer and network layer frames
    Other known solutions operate on larger data blocks (frames) leading to higher jitter non-TCP real-time traffic
    Reduction of system jitter
TCP retransmission and reorder buffer shrink by storing references to transported data rather than the data itself
    Other known solutions store raw data
    Saves memory by utilizing dedicated resources more effectively
Co-operative (serialized) Interfaces
    Simplifies co-operative implementation of multiple instances
    Usage of an external descriptor pool used by multiple protocol layers
    Saves memory by sharing resource with other functions
Sequence number management based on length indicators rather than counting data length
    Higher transparency to client protocol implementation
    Optional client layer sub-segmentation for optimum TCP segment utilization

What is claimed is:

1. A method for transmitting data between two devices in at least one of a client layer and a transport layer of a communication system, comprising:
buffering, in a central storage apparatus, the data to be transmitted; and
performing the data transmission according to the transport control protocol (TCP);
wherein a TCP protocol operation hardware component handles only references on the data to be transmitted, the references being stored in the central storage apparatus, instead of the actual data itself,
wherein no actual raw data is handled by the TCP protocol operation hardware component, and
wherein the TCP protocol operation hardware component houses:
a hardware retransmission buffer that stores TCP segments,
a hardware sender block in communication with the hardware retransmission buffer and having a client layer receive interface and a network layer transmit interface,
a hardware receiver block in communication with the hardware sender and including a client layer transmit interface and a network layer receive interface, and
a hardware re-order buffer in communication with the hardware receiver block, wherein:
the hardware re-order buffer includes three zones,
a first zone includes a first free buffer that exceeds a defined receive socket buffer size,
a second zone includes an occupied buffer storing already received TCP segments having data not yet consumed by the client layer, and
a third zone includes a second free buffer for receiving new data from a network.

2. The method according to claim 1, wherein measurement, calibration and diagnostics data are transmitted in the communication system between (i) an automotive electronic control unit and (ii) an automotive development software tool which runs on an external personal computer.

3. The method according to claim 2, wherein the central storage apparatus is used across all communication layers.

4. The method according to claim 2, wherein:
the data are transmitted in data frames; and
client layer frames and network layer frames are segmented into smaller subunits of data before transmission.

5. The method according to claim 2, wherein:
the references on the data to be transported are stored in the retransmission buffer.

6. The method according to claim 2, wherein:
the TCP protocol operation hardware component includes a reorder buffer; and
the references on the data to be transported are stored in the reorder buffer.

7. The method according to claim 1, wherein the actual raw data is exchanged directly between an IP/UDP and Ethernet Media Access block and the central storage apparatus without ever reaching the TCP protocol operation hardware component.

8. The method according to claim 1, wherein the TCP protocol operation hardware component is implemented as one of an FPGA and an ASIC.

9. A communication system adapted for transmitting data between two devices in at least one of a client layer and a transport layer of the communication system, wherein the data transmission is performed according to the transport control protocol (TCP), comprising:
   a central storage apparatus buffering the data to be transmitted; and
   a TCP protocol operation hardware component handling only references on the data to be transmitted, the references being stored in the central storage apparatus, instead of the actual data itself,
   wherein no actual raw data is handled by the TCP protocol operation hardware component, and
   wherein the TCP protocol operation hardware component houses:
      a hardware retransmission buffer that stores TCP segments,
      a hardware sender block in communication with the hardware retransmission buffer and having a client layer receive interface and a network layer transmit interface,
      a hardware receiver block in communication with the hardware sender and including a client layer transmit interface and a network layer receive interface, and
      a hardware re-order buffer in communication with the hardware receiver block, wherein:
      the hardware re-order buffer includes three zones,
      a first zone includes a first free buffer that exceeds a defined receive socket buffer size,
      a second zone includes an occupied buffer storing already received TCP segments having data not yet consumed by the client layer, and
      a third zone includes a second free buffer for receiving new data from a network.

10. The communication system according to claim 9, wherein measurement, calibration and diagnostics data are transmitted in the communication system between (i) an automotive electronic control unit and (ii) an automotive development software tool which runs on an external personal computer.

11. The communication system according to claim 10, wherein the communication system includes an embedded acquisition device located between the automotive electronic control unit and the development software tool, and wherein the TCP protocol operation hardware component is part of the embedded acquisition device.

12. The communication system according to claim 11, wherein the references on the data to be transported are stored in the retransmission buffer.

13. The communication system according to claim 9, further comprising:
   an IP/UDP and Ethernet Media Access block, wherein the actual raw data is communicated directly between the central storage apparatus and the IP/UDP and Ethernet Media Access block while bypassing the TCP protocol operation hardware component.

14. The communication system according to claim 9, wherein the TCP protocol operation hardware component is implemented as one of an FPGA and an ASIC.

15. An embedded acquisition device located between two devices of a communication system, between which two devices of the communication system data are transmitted in at least one of a client layer and a transport layer of the communication system, the embedded acquisition device being configured to perform transmission according to the transport control protocol (TCP), comprising:
   a TCP protocol operation hardware component configured to handle only references on the data to be transmitted, the references being buffered in a central storage apparatus of the communication system, instead of the actual data itself, wherein no actual raw data is handled by the TCP protocol operation hardware component, and
   wherein the TCP protocol operation hardware component houses:
      a hardware retransmission buffer that stores TCP segments,
      a hardware sender block in communication with the hardware retransmission buffer and having a client layer receive interface and a network layer transmit interface,
      a hardware receiver block in communication with the hardware sender and including a client layer transmit interface and a network layer receive interface, and
      a hardware re-order buffer in communication with the hardware receiver block, wherein:
      the hardware re-order buffer includes three zones,
      a first zone includes a first free buffer that exceeds a defined receive socket buffer size,
      a second zone includes an occupied buffer storing already received TCP segments having data not yet consumed by the client layer, and
      a third zone includes a second free buffer for receiving new data from a network.

16. The embedded acquisition device according to claim 15, wherein calibration and diagnostics data are transmitted in the communication system, and wherein the acquisition device is located between (i) an automotive electronic control unit and (ii) an automotive development software tool which runs on an external personal computer.

17. The embedded acquisition device according to claim 16, wherein the references on the data to be transported are stored in the retransmission buffer.

18. The embedded acquisition device according to claim 15, further comprising:
   an IP/UDP and Ethernet Media Access block, wherein the actual raw data is communicated directly between the central storage apparatus and the IP/UDP and Ethernet Media Access block while bypassing the TCP protocol operation hardware component.

19. The embedded acquisition device according to claim 15, wherein the TCP protocol operation hardware component is implemented as one of an FPGA and an ASIC.

20. A method for transmitting data between two devices in at least one of a client layer and a transport layer of a communication system, comprising:
   buffering, in a central storage apparatus, the data to be transmitted; and
   performing the data transmission according to the transport control protocol (TCP);
   wherein a TCP protocol operation hardware component handles only references on the data to be transmitted, the references being stored in the central storage apparatus, instead of the actual data itself,
   wherein no actual raw data is handled by the TCP protocol operation hardware component, and
   wherein the TCP protocol operation hardware component houses:

a hardware retransmission buffer that stores TCP segments,
a hardware sender block in communication with the hardware retransmission buffer and having a client layer receive interface and a network layer transmit interface,
a hardware receiver block in communication with the hardware sender and including a client layer transmit interface and a network layer receive interface,
a hardware re-order buffer in communication with the hardware receiver block wherein:
the TCP protocol operation hardware component includes a hardware control unit,
the hardware control unit communicates with the hardware sender block and the hardware receiver block via respective command/status interfaces, and
the hardware sender block and the hardware receiver block communicate directly with each other via a TCP Connection interface.

21. A communication system adapted for transmitting data between two devices in at least one of a client layer and a transport layer of the communication system, wherein the data transmission is performed according to the transport control protocol (TCP), comprising:
a central storage apparatus buffering the data to be transmitted; and
a TCP protocol operation hardware component handling only references on the data to be transmitted, the references being stored in the central storage apparatus, instead of the actual data itself,
wherein no actual raw data is handled by the TCP protocol operation hardware component, and
wherein the TCP protocol operation hardware component houses:
a hardware retransmission buffer that stores TCP segments,
a hardware sender block in communication with the hardware retransmission buffer and having a client layer receive interface and a network layer transmit interface,
a hardware receiver block in communication with the hardware sender and including a client layer transmit interface and a network layer receive interface, and
a hardware re-order buffer in communication with the hardware receiver block, wherein:
the TCP protocol operation hardware component includes a hardware control unit,
the hardware control unit communicates with the hardware sender block and the hardware receiver block via respective command/status interfaces, and
the hardware sender block and the hardware receiver block communicate directly with each other via a TCP Connection interface.

22. An embedded acquisition device located between two devices of a communication system, between which two device of the communication system data are transmitted in at least one of a client layer and a transport layer of the communication system, the embedded acquisition device being configured to perform transmission according to the transport control protocol (TCP), comprising:
a TCP protocol operation hardware component configured to handle only references on the data to be transmitted, the references being buffered in a central storage apparatus of the communication system, instead of the actual data itself, wherein no actual raw data is handled by the TCP protocol operation hardware component, and
wherein the TCP protocol operation hardware component houses:
a hardware retransmission buffer that stores TCP segments,
a hardware sender block in communication with the hardware retransmission buffer and having a client layer receive interface and a network layer transmit interface,
a hardware receiver block in communication with the hardware sender and including a client layer transmit interface and a network layer receive interface, and
a hardware re-order buffer in communication with the hardware receiver block, wherein:
the TCP protocol operation hardware component includes a hardware control unit,
the hardware control unit communicates with the hardware sender block and the hardware receiver block via respective command/status interfaces, and
the hardware sender block and the hardware receiver block communicate directly with each other via a TCP Connection interface.

* * * * *